United States Patent
Wang et al.

(10) Patent No.: US 7,057,794 B2
(45) Date of Patent: Jun. 6, 2006

(54) MICROMIRROR FOR MEMS DEVICE

(75) Inventors: Shen-Ping Wang, Keelung (TW); Yuh-Hwa Chang, Shulin (TW); Fei-Yuh Chen, Hinchu (TW); David Ho, Taichung (TW); Chia-Chiang Chen, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 43 days.

(21) Appl. No.: 10/849,672

(22) Filed: May 19, 2004

(65) Prior Publication Data

US 2005/0259311 A1  Nov. 24, 2005

(51) Int. Cl.
*G02B 26/00* (2006.01)
*B05D 5/06* (2006.01)
(52) U.S. Cl. .................. 359/290; 359/291; 427/166
(58) Field of Classification Search .......... 359/290, 359/291; 427/166, 168
See application file for complete search history.

(56) References Cited

U.S. PATENT DOCUMENTS

| | | | | |
|---|---|---|---|---|
| 4,566,935 A | * | 1/1986 | Hornbeck | 438/29 |
| 4,956,619 A | * | 9/1990 | Hornbeck | 359/317 |
| 5,008,217 A | * | 4/1991 | Case et al. | 438/681 |
| 5,151,305 A | * | 9/1992 | Matsumoto et al. | 427/250 |
| 6,258,174 B1 | * | 7/2001 | Matsumoto et al. | 118/725 |
| 6,337,760 B1 | * | 1/2002 | Huibers et al. | 359/291 |
| 6,396,619 B1 | * | 5/2002 | Huibers et al. | 359/291 |
| 6,529,310 B1 | * | 3/2003 | Huibers et al. | 359/291 |
| 6,562,471 B1 | * | 5/2003 | Martin et al. | 428/457 |
| 6,867,897 B1 | * | 3/2005 | Patel et al. | 359/291 |
| 6,913,942 B1 | * | 7/2005 | Patel et al. | 438/48 |
| 6,929,969 B1 | * | 8/2005 | Tzeng et al. | 438/52 |

\* cited by examiner

*Primary Examiner*—David N. Spector
(74) *Attorney, Agent, or Firm*—Tung & Associates

(57) ABSTRACT

A micromirror which includes a substrate, a reflective layer comprising pure aluminum overlying the substrate and a protective layer comprising titanium nitride overlying the reflective layer is disclosed.

20 Claims, 5 Drawing Sheets

MICROMIRROR FOR MEMS DEVICE

FIELD OF THE INVENTION

The present invention relates to micromirrors used in MEMS (micro-electro-mechanical systems). More particularly, the present invention relates to a novel multi-layered micromirror which includes a top titanium nitride (TiN) layer and a pure aluminum (Al) layer which underlies the TiN layer to reduce the incidence of defects in a micromirror.

BACKGROUND OF THE INVENTION

New advancements in projection systems utilize an optical semiconductor known as a digital micromirror device. A digital micromirror device chip may be the world's most sophisticated light switch. It contains an array of from about 750,000 to about 1.3 million pivotally-mounted microscopic mirrors. Each mirror may measure less than 1/5 of the width of a human hair and corresponds to one pixel in a projected image. The digital micromirror device chip can be combined with a digital video or graphic signal, a light source, and a projector lens so that the micromirrors reflect an all-digital image onto a screen or other surface.

Although there are a variety of digital micromirror device configurations, typically micromirrors are mounted on tiny hinges that enable each mirror to be tilted either toward the light source (on) in a projector system to reflect the light; or away from the light source (off) to create a darker pixel on the projection surface. A bitstream-to-image code entering the semiconductor directs each mirror to switch on or off several times per second. When the mirror is switched on more frequently than off, the mirror reflects a light gray pixel. When the mirror is switched off more frequently than on, the mirror reflects a darker gray pixel. Some projection systems can deflect pixels enough to generate 1,024 shades of gray to convert the video or graphic signal entering the digital micromirror device into a highly-detailed grayscale image. In some systems, light generated by a lamp passes through a color wheel as it travels to the surface of the digital micromirror device panel. The color wheel filters the light into red, green and blue. A single-chip digital micromirror vice projector system can create at least 16.7 million colors. When three digital micromirror device chips are utilized, more than 35 trillion colors can be produced. The "on" and "off" states of each micromirror are coordinated with the three basic building blocks of color (red, green and blue) to produce a wide variety of colors.

A variety of digital micromirror devices (DMD) are known. FIG. 1 illustrates one embodiment of a prior art DMD that may be used in the present invention with the substitution of a unique mirror structure according to the present invention. As shown in FIG. 1, a DMD 10 may include a semiconductor device 12 such as a CMOS memory device that includes circuitry 13 that is used to activate an electrode(s) in response to a video or graphic signal. A first layer 14 is formed over the semiconductor device 12 and may include a yoke address electrode 16, vias 18 formed therein down to the circuitry 13 on the semiconductor device 12, and a bias-reset bus 20. A second layer 22 is formed over the first layer 14 and may include a yoke 24, a torsion hinge 26 and mirror address electrodes 28. A micromirror 32 is formed over the second layer 22 and positioned so that the micromirror 32 may be deflected diagonally when one of the electrodes 28 is activated by the semiconductor device 12. The micromirror 32 includes a reflective layer typically including aluminum. The DMD 10 shown in FIG. 1, while being an excellent engineering accomplishment, is very complex, costly to manufacture and has a low manufacturing yield. Further, the micromirror 32 may include defects, as will be described hereinafter with respect to a second configuration of a DMD.

FIG. 2 illustrates a first subassembly 40 for a second type of DMD. The subassembly 40 may include a transparent layer 42 which may be any transparent material including, but not limited to, glass. A hinge 44 is formed on the transparent layer 42 and a micromirror 32 is secured thereto for pivotal movement with respect to the hinge 44 and the transparent layer 42.

FIG. 3 illustrates the first subassembly 40 including a plurality of micromirrors 32, each connected by a hinge 44 to the transparent layer 42. All of the components and subassemblies of the various DMD devices can be made by semiconductor or MEM micro processing techniques known to those skilled in the art.

FIG. 4 illustrates a second subassembly 46 of the second type of DMD and may include a semiconductor device 12 such as, but not limited to, a CMOS memory device. A plurality of electrodes 48, one for each micromirror 32, are formed over the semiconductor device 12 for communication with the circuitry (not shown) contained therein so that the electrode 48 may be selectively activated in response to a video or graphic signal.

FIG. 5 illustrates a DMD structure 10 that may be utilized by the present invention with the substitution of a unique micromirror structure according to the present invention. The DMD of FIG. 5 includes the first subassembly 40 flipped over and overlying the second subassembly 46 so the micromirrors 32 of the first subassembly 40 face and are closest to the electrodes 48 of the second subassembly 46. Spacers 50 are provided so that the micromirrors 32 are spaced a distance from the electrodes 48 and so that each micromirror 32 is free to be deflected or pivotally-moved by the activation of an associated electrode 48. As illustrated in FIG. 5, when light is directed onto the micromirrors 32, an electrode 48 associated with each micromirror 32 may be activated to cause the micromirror 32 to pivotally move about the hinge 44. As a result, the light will be reflected or not depending on whether or not the electrode 48 associated with the micromirror 32 has been activated. As described above, depending on how fast and how often a particular micromirror 32 is deflected by the corresponding electrode 48, the image projected by the micromirror 32 (pixel) will appear light or dark on the projection screen (not shown) or other surface.

Conventional micromirrors often include hillocks (raised features or bumps) 54 or voids 52 in the aluminum layer, as shown in FIGS. 6 and 7. Typically, the micromirror 32 includes a sputtered-on-aluminum coating which may often include hillocks 54 or voids 52. The hillocks 54 or voids 52 can cause artifacts or distortions in the projected image.

FIG. 8 illustrates a typical multi-layered structure of a conventional micromirror 32. The micromirror 32 includes a substrate 60, which is typically glass; a first protective layer 62, which is typically PEOX (plasma-enhanced oxide), deposited on the substrate 60; a reflective layer 64, which is typically AlSiCu, deposited on the first protective layer 62; a treatment layer 66, typically titanium (Ti), deposited on the reflective layer 64; and a second protective layer 68, typically PEOX, deposited on the treatment layer 66.

One of the problems associated with the use of AlSiCu as the reflective layer 64 is that metal pits tend to form in the reflective layer 64. Furthermore, the silicon tends to precipitate in the reflective layer 64, causing unstable contrast ratios of light reflected from the micromirror 32. Use of pure aluminum for the reflective layer 64 imparts severe metal roughness to the surface of the reflective layer 64, thus distorting the light reflected from the micromirror 32. Moreover, the use of PEOX for the second protective layer 68 provides an unstable mirror spacer etching stop point, leading to compromised CID uniformity.

It has been found that the use of pure aluminum (Al) as the reflective layer 64 substantially reduces or eliminates the formation of pits in the reflective layer 64. Furthermore, it has been found that deposition of TiN at room temperature as the second protective layer 68 substantially reduces or eliminates surface roughness in the reflective layer 64. Moreover, the TiN second protective layer 68 functions as an effective mirror spacer etching stop layer.

Accordingly, an object of the present invention is to provide a novel micromirror having enhanced reflective characteristics.

Another object of the present invention is to provide a novel micromirror characterized by reduced voids or pits.

Still another object of the present invention is to provide a novel micromirror characterized by reduced surface roughness.

Yet another object of the present invention is to provide a novel micromirror having a reflective layer which may be pure aluminum (Al) and a protective layer which may be titanium nitride (TiN).

A still further object of the present invention is to provide a novel micromirror having a reflective layer which is substantially devoid of precipitates.

Another object of the present invention is to provide a micromirror having a protective layer which functions as an effective mirror spacer etching stop layer.

SUMMARY OF THE INVENTION

In accordance with these and other objects and advantages, the present invention is directed to a novel micromirror which is characterized by reduce void or pit formation and reflective layer surface roughness and precipitate formation. The micromirror includes a substrate and a reflective layer of pure aluminum and a protective layer of titanium nitride supported by the substrate. During fabrication of the micromirror, the protective layer is preferably deposited at room temperature.

BRIEF DESCRIPTION OF THE DRAWINGS

The invention will now be described, by way of example, with reference to the accompanying drawings, in which.

DETAILED DESCRIPTION OF THE INVENTION

Figure 1:
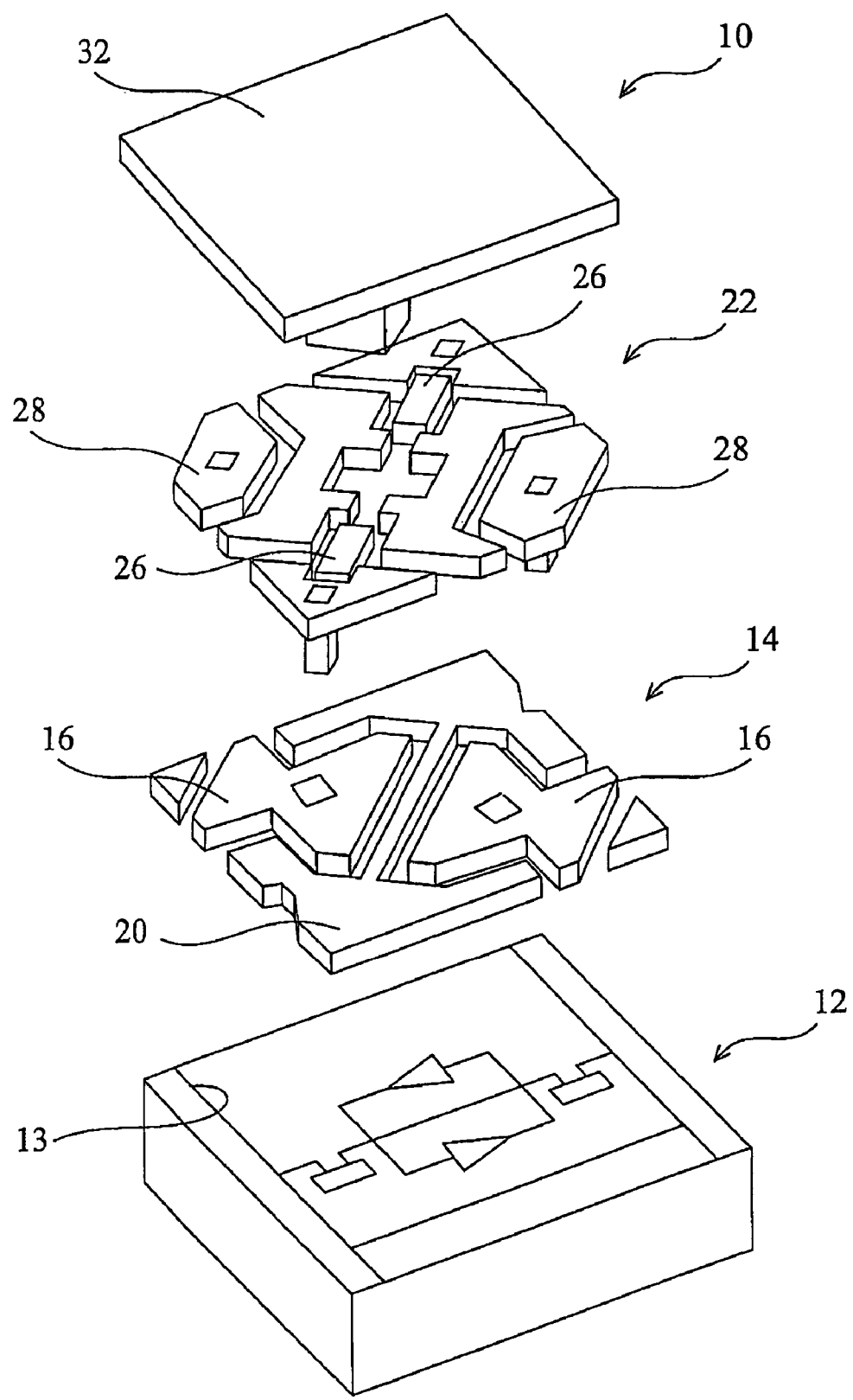
FIG. 1 is an exploded view of a conventional digital micromirror device in which a micromirror according to the present invention may be incorporated.
Figure 2:
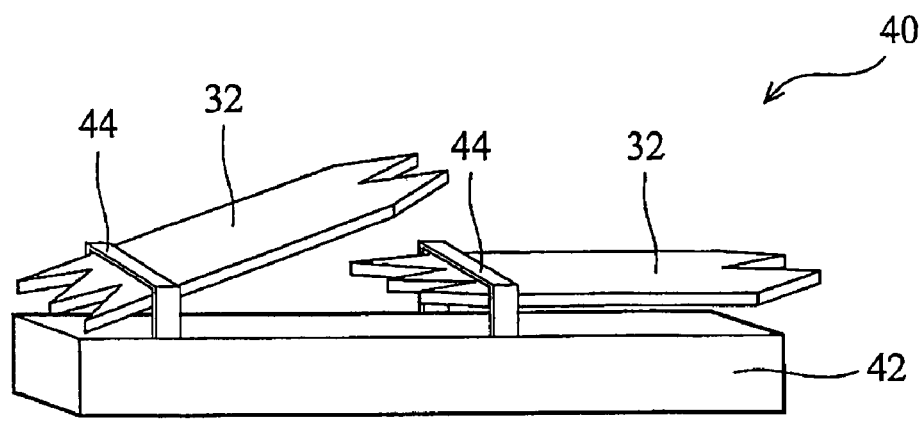
FIG. 2 illustrates a conventional digital micromirror device assembly in which a micromirror according to the present invention may be incorporated.
Figure 3:
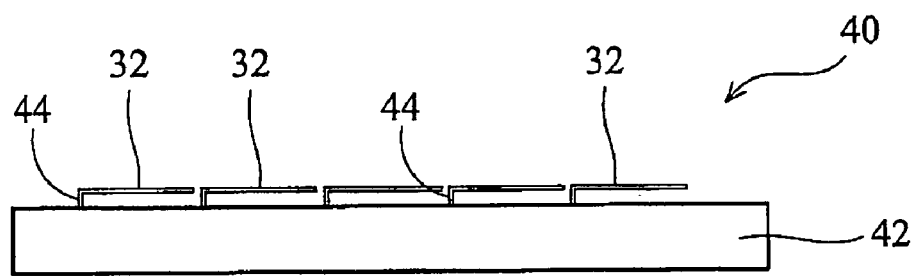
FIG. 3 illustrates a conventional digital micromirror device subassembly in which a micromirror according to the present invention may be incorporated.
Figure 4:
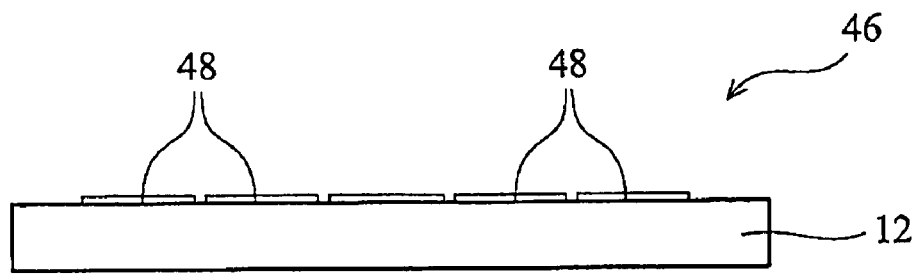
FIG. 4 illustrates a conventional digital micromirror device subassembly.
Figure 5:
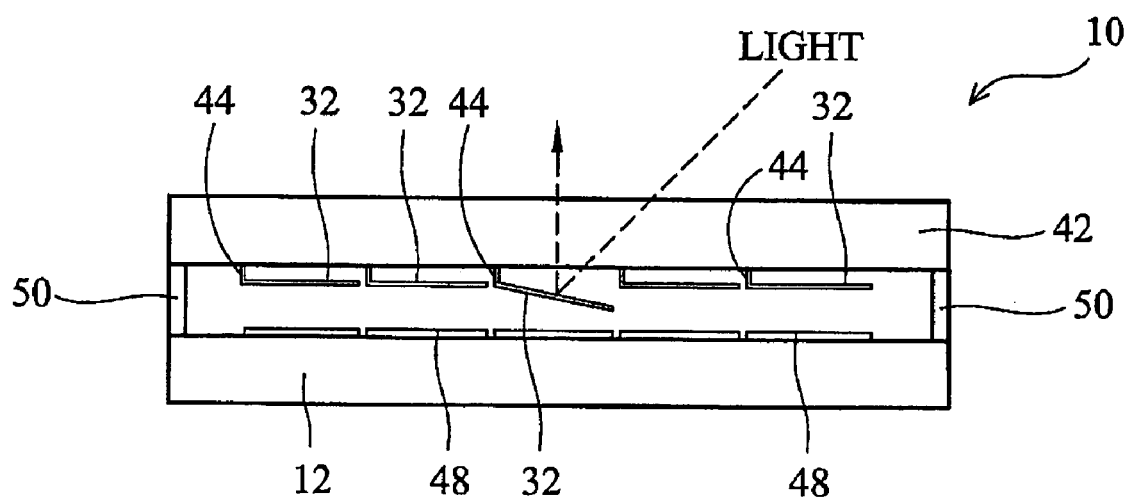
FIG. 5 is an exploded view of a conventional digital micromirror device in which a micromirror according to the present invention may be incorporated.
Figure 6:
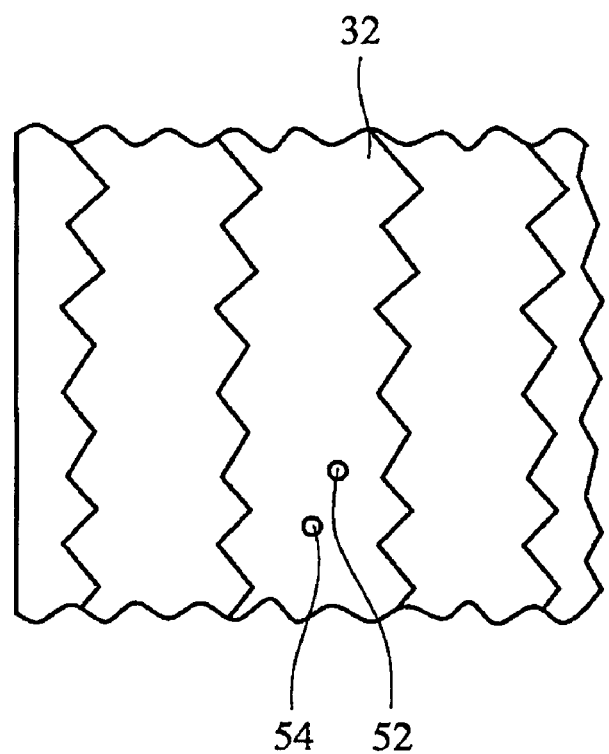
FIG. 6 illustrates a conventional micromirror having hillocks and voids.
Figure 7:
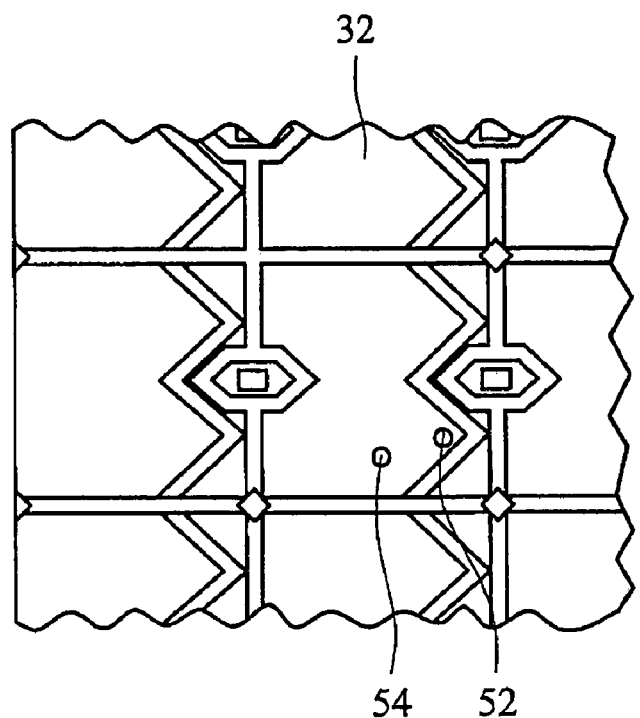
FIG. 7 illustrates a conventional micromirror having hillocks and voids.
Figure 8:
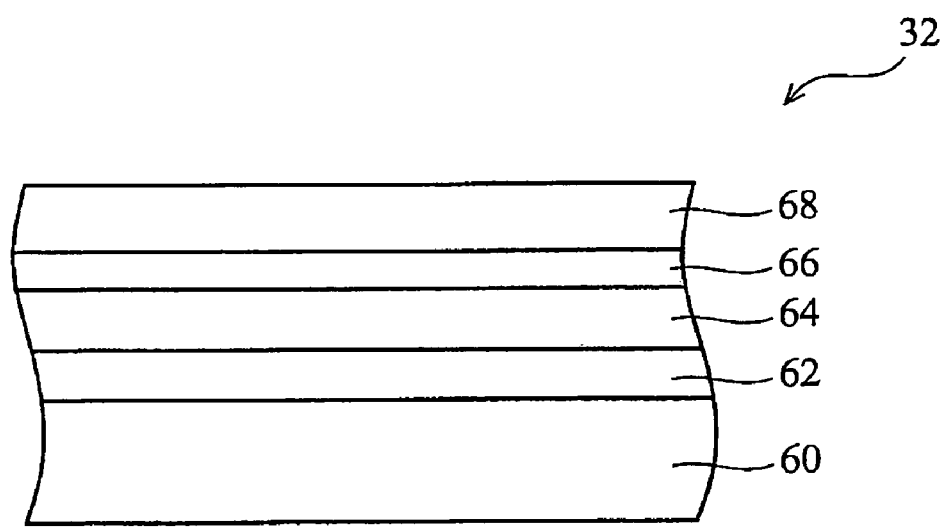
FIG. 8 illustrates a conventional multi-layered micromirror structure.
Figure 9:
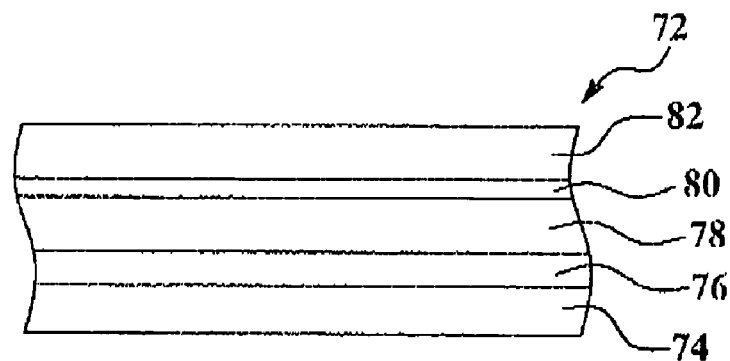
FIG. 9 illustrates a multi-layered micromirror structure according to the present invention.

An illustrative embodiment of a micromirror 72 according to the present invention is shown in FIG. 9. The micromirror 72 includes a substrate 74, which is typically glass. The micromirror 72 may include a first protective layer 76 which may be any known protective layer including, but not limited to, silicon nitride, silicon oxide or silicon oxynitride. In one embodiment, the first protective layer 76 includes plasma enhanced silicon oxide (PEOX) or silicon oxide. The first protective layer 76 may have a thickness ranging from typically about 200 angstroms to typically about 600 angstroms. Preferably, the first protective layer 76 has a thickness of typically about 400 angstroms.

The micromirror 72 may include a reflective layer 78 overlying the first protective layer 76. As used herein, the description of a first layer "overlying" or "overlies" (or similar language) a second layer means that the first layer may be in direct contact with the second layer or that an additional layer or layers may be interposed between the first and second layers. The reflective layer 78 includes a light reflecting material and is preferably pure aluminum. In one embodiment, the reflective layer 78 has a thickness of typically about 2,000–4,000 angstroms, and preferably, typically about 2,800 angstroms. The reflective layer 78 may be formed using any method known to those skilled in the art, including screen printing, chemical vapor deposition (CVD), or by securing a foil to the first protective layer 76. Preferably, the reflective layer 78 is formed by sputtering aluminum onto the first protective layer 76 or onto another surface from which the reflective layer 78 can be removed. It will be appreciated by those skilled in the art that the pure aluminum reflective layer 78 is substantially devoid of hillocks and voids.

The micromirror 72 may include a treatment layer 80 overlying the reflective layer 78. The treatment layer 80 includes a material which is formed to a thickness sufficient to effectively eliminate or substantially reduce the effective number of hillocks and voids in the reflective layer 78, thereby reducing the number of artifacts and distortions produced in the image projected from the micromirror 72. Preferably, the treatment layer 80 includes titanium. The treatment layer 80 may be formed using any method known to those skilled in the art, but preferably, is sputtered onto the reflective layer 78 or onto a layer (not shown) overlying the reflective layer 78. The treatment layer 80 may be any thickness including but not limited to typically about 20–200 angstroms. Most preferably, the treatment layer 80 may be typically about 80 angstroms thick. The treatment layer 80 may also provide stress relief or lubricating functions.

A second protective layer 82 may overlie the treatment layer 80. The second protective layer 82 is preferably titanium nitride, which is deposited by conventional physical vapor deposition (PVD) techniques at room temperature.

Preferably, the second protective layer 82 has a thickness of typically about 200–1,000 angstroms, and most preferably, typically about 500 angstroms. It will be appreciated by those skilled in the art that when the second protective layer 82 is titanium nitride deposited at room temperature, the surface of the reflective layer 78 is characterized by substantially reduced surface roughness.

Figure 10:
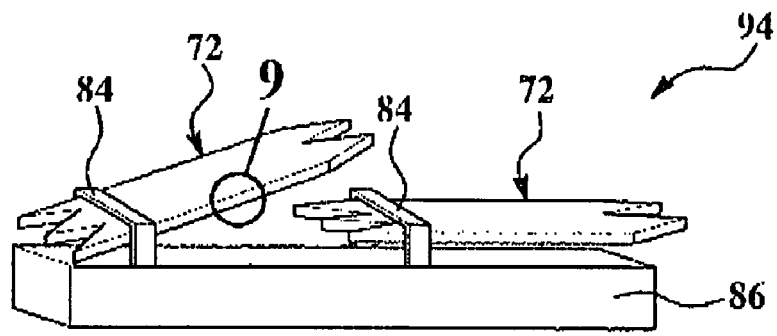
FIG. 10 illustrates a pair of micromirrors of the present invention hingedly attached to a transparent substrate.

FIG. 10 illustrates a first subassembly 94 for a digital micromirror device (DMD) 98 which will be hereinafter further described with respect to FIG. 11, which first subassembly 94 includes multiple micromirrors 72 according to the present invention. The first subassembly 94 may include a transparent layer or substrate 86 which may be any transparent material including, but not limited to, glass. A hinge 84 is formed on the transparent substrate 86. Each micromirror 72 is secured to the transparent substrate 86 for pivotal movement with respect to the corresponding hinge 84 and the transparent substrate 86. Fabrication of the first subassembly 94 can be carried out using conventional techniques known to those skilled in the art.

Figure 11:
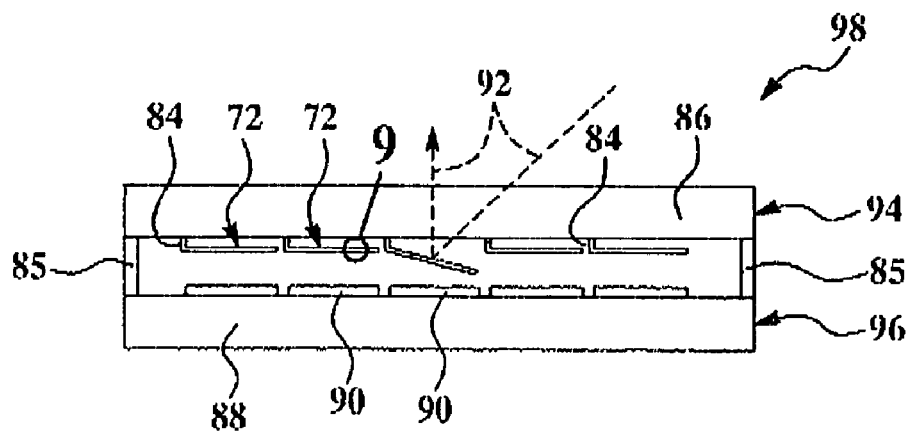
FIG. 11 illustrates multiple micromirrors of the present invention mounted in a digital micromirror device.

As shown in FIG. 11, the DMD 98 typically further includes a second subassembly 96 which may include a semiconductor device 88 such as, but not limited to, a CMOS memory device. Multiple electrodes 90, one for each micromirror 72 of the first subassembly 94, are formed on the semiconductor device 88. Each of the electrodes 90 communicates with electronic circuitry (not shown) on the semiconductor device 88 so that each electrode 90 may be selectively activated in response to a video or graphic signal. Fabrication of the second subassembly 96 can be carried out using conventional techniques known to those skilled in the art.

As further shown in FIG. 11, the DMD 98 typically includes the first subassembly 94 flipped over and overlying the second subassembly 96 so the micromirrors 72 of the first subassembly 94 face and are closest to the respective electrodes 90 of the second subassembly 96. Spacers 85 are provided so that the micromirrors 72 are spaced from the respective electrodes 90 and so that each micromirror 72 can freely pivot on the corresponding hinge 84 responsive to activation of an associated electrode 90.

In operation of the DMD 98, as light 92 is directed onto the micromirrors 72, an electrode 90 associated with each micromirror 72 may be activated to cause the micromirror 72 to pivotally move about the corresponding hinge 84. Consequently, depending on whether or not the electrode 90 associated with any particular micromirror 72 has been activated, the light 92 may or may not be reflected from that micromirror 72. Depending on how fast and how often a particular micromirror 72 is deflected by the corresponding electrode 98, the image (pixel) projected by the micromirror 72 will appear light or dark on a projection screen (not shown) or other surface. It will be appreciated by those skilled in the art that, due to the reduced surface roughness of the reflective layer 78 (FIG. 9) in each micromirror 72, as well as the absence of precipitates, hillocks, and pits or voids in the reflective layer 78, the micromirrors 72 are collectively capable of projecting a high-quality image from the DMD device 98 onto the projection screen (not shown) or other surface.

While the preferred embodiments of the invention have been described above, it will be recognized and understood that various modifications can be made in the invention and the appended claims are intended to cover all such modifications which may fall within the spirit and scope of the invention.

What is claimed is:

1. A multi-layer micromirror structure comprising:
   a substrate layer;
   a reflective layer comprising pure aluminum overlying said substrate layer; and
   a protective layer comprising titanium nitride overlying said reflective layer.

2. The micromirror of claim 1 further comprising a treatment layer interposed between said reflective layer and said protective layer.

3. The micromirror of claim 1 further comprising a first protective layer interposed between said substrate and said reflective layer and wherein said protective layer comprising titanium nitride comprises a second protective layer.

4. The micromirror of claim 3 further comprising a treatment layer interposed between said reflective layer and said second protective layer.

5. The micromirror of claim 1 wherein said reflective layer is from about 2,000 angstroms to about 4,000 angstroms thick and said protective layer is from about 200 angstroms to about 1,000 angstroms thick.

6. The micromirror of claim 5 further comprising a treatment layer interposed between said reflective layer and said protective layer.

7. The micromirror of claim 5 further comprising a first protective layer interposed between said substrate layer and said reflective layer and wherein said protective layer comprising titanium nitride comprises a second protective layer.

8. The micromirror of claim 7 further comprising a treatment layer interposed between said reflective layer and said second protective layer.

9. A multi-layered micromirror structure comprising:
   a substrate layer;
   a first protective layer overlying said substrate layer;
   a reflective layer comprising pure aluminum overlying said first protective layer;
   a treatment layer overlying said reflective layer; and
   a second protective layer comprising titanium nitride overlying said treatment layer.

10. The micromirror of claim 9 wherein said first protective layer comprises plasma-enhanced silicon oxide.

11. The micromirror of claim 9 wherein said treatment layer comprises titanium.

12. The micromirror of claim 11 wherein said first protective layer comprises plasma-enhanced silicon oxide.

13. The micromirror of claim 9 wherein said reflective layer is about 2,800 angstroms thick and said second protective layer is about 500 angstroms thick.

14. The micromirror of claim 13 wherein said first protective layer comprises plasma-enhanced silicon oxide.

15. The micromirror of claim 13 wherein said treatment layer comprises titanium.

16. The micromirror of claim 15 wherein said first protective layer comprises plasma-enhanced silicon oxide.

17. A method of fabricating a multi-layered micromirror structure, comprising:
   providing a substrate layer;
   providing a reflective layer comprising pure aluminum in overlying relationship to said substrate layer; and
   depositing a protective layer comprising titanium nitride in overlying relationship to said reflective layer at room temperature.

18. The method of claim 17 wherein said providing a reflective layer comprises providing a first protective layer on said substrate layer and providing said reflective layer on said first protective layer.

19. The method of claim 17 wherein said depositing a protective layer comprises providing a treatment layer on said reflective layer and depositing said protective layer on said treatment layer.

20. The method of claim 19 wherein said providing a reflective layer comprises providing a first protective layer on said substrate layer and providing said reflective layer on said first protective layer.

* * * * *